United States Patent [19]

Uedaira et al.

[11] Patent Number: 4,547,355

[45] Date of Patent: Oct. 15, 1985

[54] METHOD FOR MANUFACTURING FINE POWDER OF $SrZrO_3$

[75] Inventors: Satoru Uedaira; Hiroshi Yamanoi; Masayuki Suzuki; Hidemasa Tamura, all of Kanagawa; Hiroyuki Suzuki, Miyagi, all of Japan

[73] Assignee: Sony Corporation, Tokyo, Japan

[21] Appl. No.: 624,818

[22] Filed: Jun. 26, 1984

[30] Foreign Application Priority Data

Jun. 27, 1983 [JP] Japan ................................ 58-115475

[51] Int. Cl.[4] .................... C01F 11/00; C01G 25/00
[52] U.S. Cl. .................................................. 423/593
[58] Field of Search ........................ 423/593, 636, 85

[56] References Cited

U.S. PATENT DOCUMENTS 4,293,534 10/1981 Arendt et al. ...................... 423/593
4,374,117 2/1983 Arendt et al. ...................... 423/593

FOREIGN PATENT DOCUMENTS 1122380 8/1968 United Kingdom ................ 423/593
165686 10/1964 U.S.S.R. ............................... 423/593
392005 7/1973 U.S.S.R. ............................... 423/593
644735 1/1979 U.S.S.R. ............................... 423/593

Primary Examiner—H. T. Carter
Attorney, Agent, or Firm—Hill, Van Santen, Steadman & Simpson

[57] ABSTRACT

A method for manufacturing fine powder of $SrZrO_3$ is described in which a hydrolyzate of a Zr compound and an Sr compound are reacted with each other in a strongly alkaline aqueous solution to obtain fine powder of $SrZrO_3$.

6 Claims, 9 Drawing Figures

METHOD FOR MANUFACTURING FINE POWDER OF SRZRO3

BACKGROUND OF THE INVENTION

1. Field of the Invention

This invention relates to a method for manufacturing fine powder for strontium zirconate, $SrZrO_3$, which is one of dielectric materials.

2. Description of the Prior Art

In recent years, manufacture of fine powder of ceramic materials has been studied and developed from different angles. One of the applications of the finely divided ceramic materials is an application to ceramic capacitors. The recent trend of electronic articles is towards compactness and high performance. Capacitors which are one of important parts of the articles are naturally required to be small in size and light in weight with large capacitance and improved high frequency characteristic. In order to satisfy the requirements, there is recently an increasing demand of multilayer ceramic capacitors. For the manufacture of the multilayer ceramic capacitors, there are needed ceramic materials which have high dielectric constant and are in the form of powder having a fine and uniform size.

Finely divided ceramic materials may be applied not only to the above-described ceramic capacitors, but also to the optical fields.

One of known ceramic materials used for the above purposes strontium zirconate, $SrZrO_3$. Fine powder of the strontium zirconate has been heretofore produced, for example, by a procedure which comprises mixing powders of strontium carbonate, $SrCO_3$, and zirconium oxide, $ZrO_2$, molding the mixture under pressure, subjecting the molded mixture to solid phase reaction at about 1400° C., and mechanically pulverizing the resulting product to obtain a fine powder. The fine powder of $SrZrO_3$ obtained by the above procedure is disadvantageous in the large and nonuniform size thereof. According to the above method, the particle size is classified by sieving, with the attendant drawback that impurities are inevitably incorporated therein in relatively large amounts along with coarse particles. Aside from the above method, several methods are known including an alkoxide method, an oxalate method, and the like. These methods involve the problem of high production cost.

SUMMARY OF THE INVENTION

It is an object of the present invention to provide an improved method of manufacturing very fine powder of strontium zirconate which is uniform in size.

It is another object of the invention to provide a method of manufacturing fine powder of strontium zirconate which has high surface activity.

It is a further object of the invention to provide a method of manufacturing fine powder of strontium zirconate which can be obtained inexpensively because of use of cheap starting materials.

The above objects can be achieved, according to the invention, there is provided a method of manufacturing fine powder of strontium zirconate which comprises the steps of:

reacting a hydrolyzate of a zirconium compound with a strontium compound in a strongly alkaline aqueous solution for a time sufficient to complete the reaction at a temperature not lower than 88° C., thereby forming $SrZrO_3$ as a precipitate;

separating the precipitate from the solution; and
drying the precipitate to obtain a fine powder of $SrZrO_3$.

DETAILED DESCRIPTION AND EMBODIMENTS OF THE INVENTION

Figure 1:
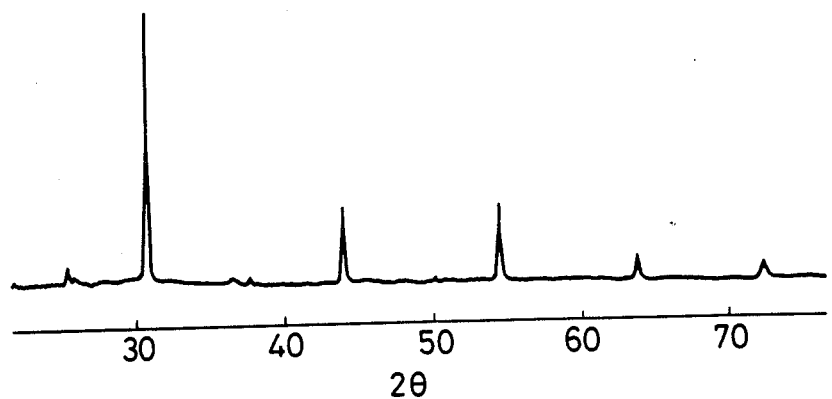
FIG. 1 is an X-ray diffraction pattern of fine powder of $SrZrO_3$ obtained according to the present invention.

The present invention is characterized by reaction between a hydrolyzate of a Zr compound and an Sr compound in a strongly alkaline aqueous solution, thereby forming fine powder of $SrZrO_3$ as precipitate.

Zr compounds used as a hydrolyzate for reaction with strontium compounds should be soluble in water and include, for example, $ZrCl_4$, $ZrOCl_2.8H_2O$, $Zr(NO_3)_4$, $ZrO(NO_3)_2.2H_2O$, $Zr(SO_4)_2$, and $ZrOSO_4$.

In order to obtain a hydrolyzate of a zirconium compound such as zirconium chloride, an aqueous solution of the chloride is prepared, to which is added an alkaline substance such as ammonium hydroxide, sodium hydroxide, potassium hydroxide, lithium hydroxide or the like until the pH of the solution becomes neutral. As a result, $ZrO_2.xH_2O$ is formed. When zirconium chloride is used as the zirconium compound, a strontium compound may be added prior to or after the hydrolysis. On the other hand, with zirconium sulfate, after an aqueous solution of the sulfate is prepared and hydrolyzed to form $ZrO_2.xH_2O$, it is necessary to remove sulfate radicals such as by filtration or washing with water. In this case, Sr compounds should be added after completion of the hydrolysis.

Sr compounds useful in the practice of the invention include, for example, $SrO$, $Sr(OH)_2$, $Sr(OH)_2.8H_2O$, $SrCl_2$, $Sr(NO_3)_2$, and $Sr(CH_3COO)_2$.

$SrZrO_3$ is prepared by reaction between a strontium compound and a hydrolyzate of a zirconium compound in a strongly alkaline aqueous solution. The pH of the strongly alkaline aqueous solution is generally not lower than 14.45, preferably not lower than 14.6. The molar ratio of Sr and Zr in the solution is generally not smaller than 0.35, preferably not smaller than 0.7. The reaction time is over 1 hour, preferably over 3 hours. The reaction temperature is 88° C. or higher.

As a result of the reaction, fine powder of $SrZrO_3$ is formed as precipitate. The powder is as fine as from 1 to 3 microns and uniform in size. After completion of the reaction, the precipitate is usually separated, washed with water and dried.

When such a fine powder is used to make, for example, a multilayer ceramic capacitor, it becomes possible to give a large capacitance and improve a high frequency characteristic as well as to make the capacitor small in size and light in weight. According to the method of the invention, because inexpensive starting materials are used, the fine powder of $SrZrO_3$ can be manufactured more inexpensively than in the known method using the solid phase reaction or the alkoxide method.

The present invention is described in more detail by way of examples.

EXAMPLE 1

50 g of $ZrCl_4$ was added to 100 cc of iced water while agitating thereby obtaining an aqueous solution of Zr oxide. To the solution was added an aqueous solution of $Sr(NO_3)_2$ in such an amount that Sr and Zr were contained in equimolar quantities, after which a KOH solution was added in order to adjust the pH to 14.8, followed by reaction at 100° C. for 8 hours. After completion of the reaction, the resulting precipitate was filtered, washed with water, and dried over day and night at 80° C.

Figure 2:
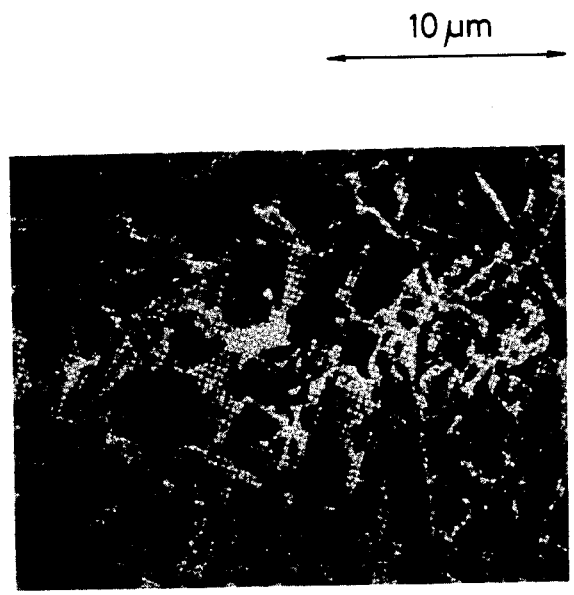
FIGS. 2 and 3 are scanning electron micrographs of $SrZrO_3$ of the invention.
Figure 3:
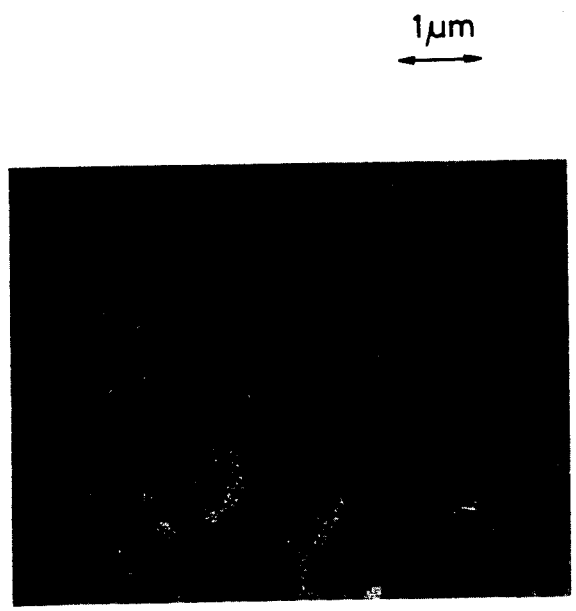

The substance obtained by the above procedure was subjected to the X-ray diffraction analysis using a copper target and a nickel filter. The results are shown in FIG. 1. According to the ASTM card, this substance had the same diffraction pattern as 10-268 and was thus identified as $SrZrO_3$. The scanning electron micrographs of the substance are shown in FIGS. 2 and 3.

EXAMPLE 2

50 g of $ZrCl_4$ was added to 100 cc of water while agitating to obtain an aqueous solution of Zr oxide. To the solution was added an NaOH solution for neutralization to make the pH at approximately 7, followed by adding $SrCl_2$ in such an amount that equimolar quantities of Sr and Zr were contained. Thereafter, the pH of the mixture was adjusted to 14.7 by addition of an NaOH solution, followed by reaction at 100° C. for 8 hours. The resulting precipitate was filtered, washed with water, and dried at 100° C. for 1 day.

The substance obtained by the above procedure had the same X-ray diffraction pattern as in FIG. 1 and was thus identified as $SrZrO_3$. According to the observation of a scanning electron microscope, fine particles were similar to those of FIGS. 2 and 3.

EXAMPLE 3

50 g of $ZrCl_4$ was added to 200 cc of iced water while agitating to obtain an aqueous solution of Zr oxide. To the solution was added a solution of $NH_4OH$ for hydrolysis with the pH being adjusted to approximately 7. Subsequently, $Sr(OH)_2$ was added to the solution in such an amount that Sr and Zr were in equimolar quantities, after which the pH was adjusted to 14.9 by means of a solution of $NH_4OH$. the thus adjusted solution was subjected to reaction at 100° C. for 9 hours. After completion of the reaction, the resulting precipitate was filtered, washed with water, and dried at 80° C. over day and night.

The substance obtained by the above procedure had the same X-ray diffraction pattern as in FIG. 1 and was thus identified a $SrZrO_3$. The observation by a scanning electron microscope revealed fine particles similar to those of FIGS. 2 and 3.

EXAMPLE 4

To 200 cc of an aqueous solution of $Zr(NH_3)_4$ was added a solution of $NH_4OH$ for neutralization with the pH being adjusted to approximately 7, after which a produced precipitate was filtered and washed with water. The precipitate was placed in one liter of water, to which was added $SrCl_2$ in such an amount that Sr and Zr were contained in equimolar quantities, followed by adjusting the pH to 14.7 by means of a solution of KOH. The solution was subjected to reaction at 100° C. for 8 hours. After completion of the reaction, the resulting precipitate was filtered and washed with water, after which it was dried over day and night at 80° C.

The substance obtained by the above procedure had the same X-ray diffraction pattern as in FIG. 1 and was thus identified as $SrZrO_3$. According to the observation of a scanning electron microscope, fine particles similar to those of FIGS. 2 and 3 were observed.

EXAMPLE 5

Figure 4:
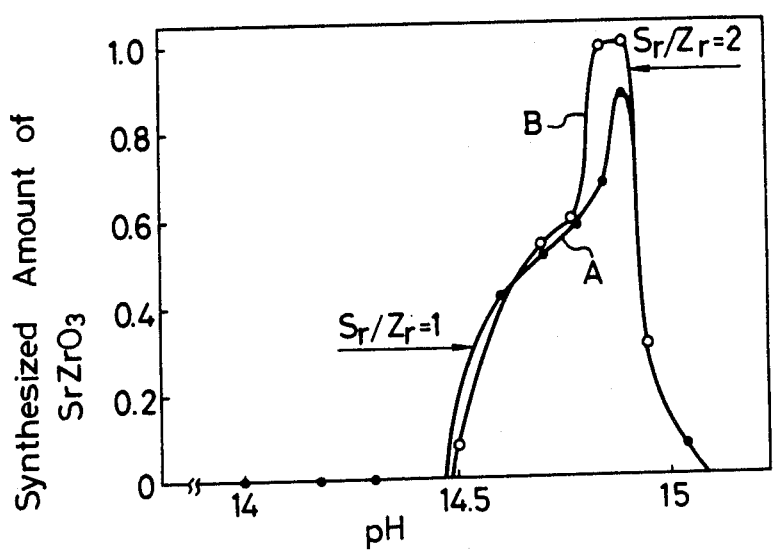
FIG. 4 is a graph showing the relation between amount of formed $SrZrO_3$ and pH of a reaction system for different ratios by mole of Sr and Zr.

In this example, the pH dependence of an amount of $SrZrO_3$ was determined. After hydrolysis of $ZrCl_4$, $Sr(NO_3)_2$ was added at $Sr/Zr=1$ (equimolar quantities), to which was added different amounts of a KOH solution to give samples of different pH concentrations. Each sample was subjected to reaction at 100° C. for 8 hours and an amount of the resulting $SrZrO_3$ of the rhombic system was measured. The results are shown in FIG. 4 as curve (A). In FIG. 4, curve (B) shows an amount of $SrZrO_3$ at $Sr/Zr=2$. The amount of $SrZrO_3$ on the ordinate is obtained by calculation from an area of the X-ray diffraction peak (002) and is a relative value in case where the maxiumum amount is taken as 1. From the figure, it will be seen that the pH is generally not lower than 14.45, preferably not lower than 14.6.

EXAMPLE 6

Figure 5:
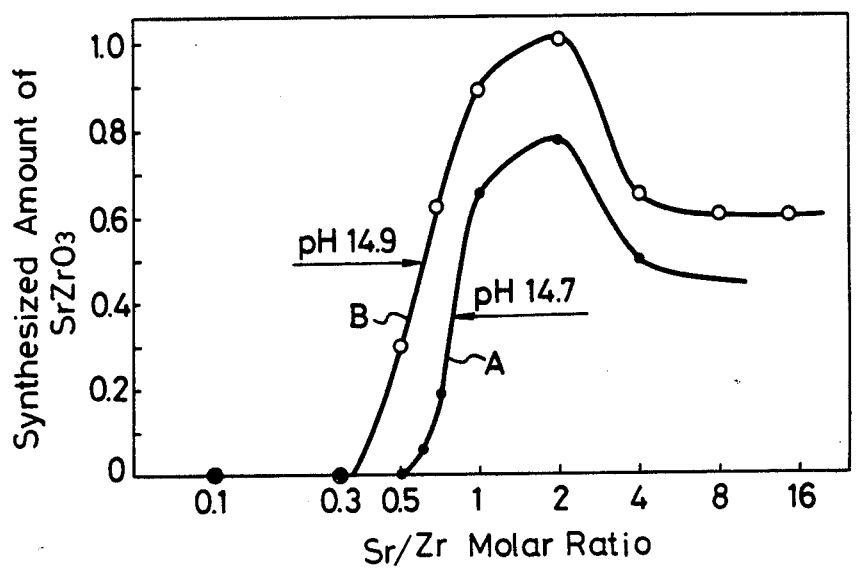
FIG. 5 is a graph showing the relation between amount of formed $SrZrO_3$ and molar ratio of Sr/Zr for different ph values.

In this example, the dependence of an amount of $SrZrO_3$ on the molar ratio was determined. Two samples having pH values of 14.7 and 14.9, respectively, were subjected to reaction at 100° C. for 9 hours at different molar ratios of Sr/Zr. The amounts of $SrZrO_3$ formed by the reaction were plotted in FIG. 5. In the figure, curve (A) indicates the case of pH at 14.7 and curve (B) indicates the case where the pH was at 14.9. From the figure, it will be seen that the molar ratio of Sr/Zr was not smaller than 0.35, preferably not smaller than 0.7.

EXAMPLE 7

Figure 6:
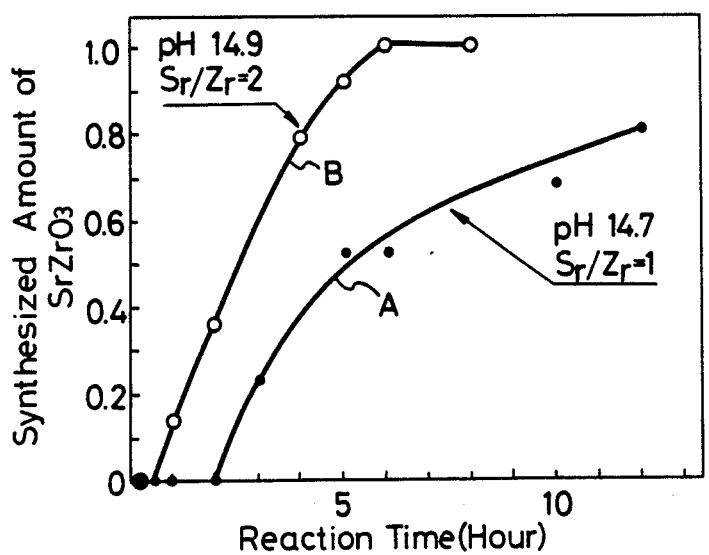
FIG. 6 is a graph showing the relation between amount of $SrZrO_3$ and reaction time for different pH values.

In this example, the dependence of an amount of $SrZrO_3$ on the reaction time was determined. Two samples which had, respectively, $Sr/Zr=1$ and $pH=14.7$ and $Sr/Zr=2$ and $pH=14.9$ were each subjected to reaction at 100° C. for different reaction times. Amounts of $SrZrO_3$ in the respective cases are plotted in FIG. 6. Curve (A) is the case using $Sr/Zr=1$ and $pH=14.7$ and curve (B) is the case using $Sr/Zr=2$ and $pH=14.9$. From the figure, it will be seen that the reaction time is generally over 1 hour, preferably over 3 hours.

EXAMPLE 8

Figure 7:
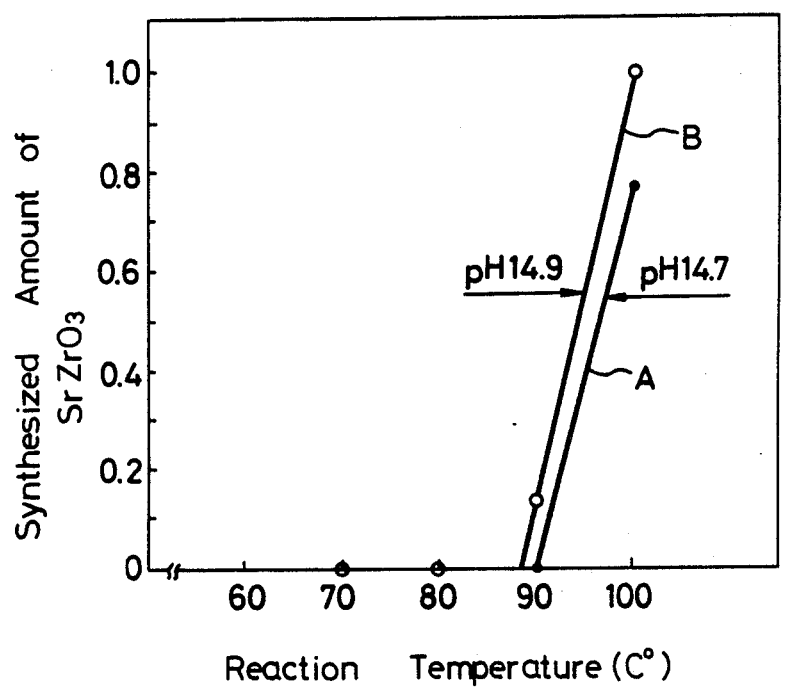
FIG. 7 is a graph showing the relation between amount of formed $SrZrO_3$ and reaction temperature.

In this example, the dependence of an amount of $SrZrO_3$ on the reaction temperature was determined. Two samples having pH values of 14.7 and 14.9, respectively, and $Sr/Zr=2$ were each subjected to reaction at different temperatures for 8 hours (except that the reaction time was 11 hours only at 90° C.). Amounts of produced SrZrO$_3$ are plotted in FIG. 7. Curve (A) is the case using pH=14.7 and curve (B) is the case using pH=14.9. From the figure, the reaction temperature should peferably not lower than 88° C.

EXAMPLE 9

Figure 8:
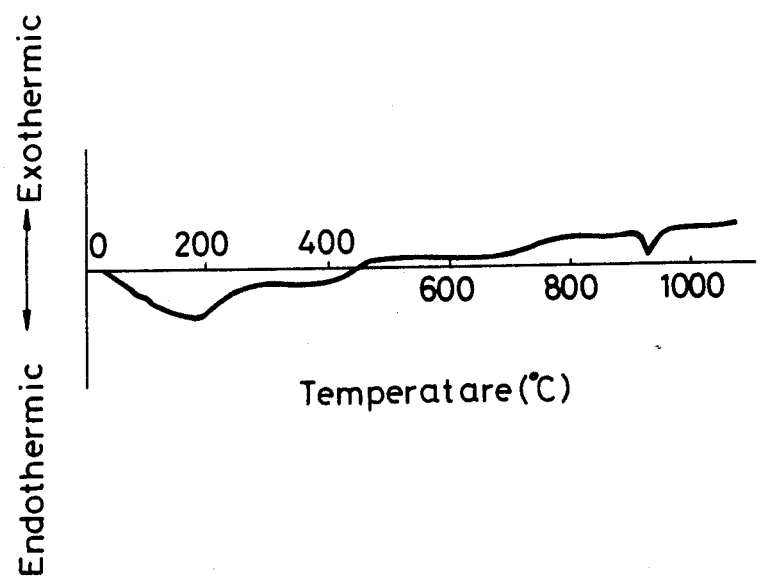
FIGS. 8 and 9 are, respectively, the results of a differential thermal analysis and a thermogravimetric analysis of $SrZrO_3$ obtained according to the invention.
Figure 9:
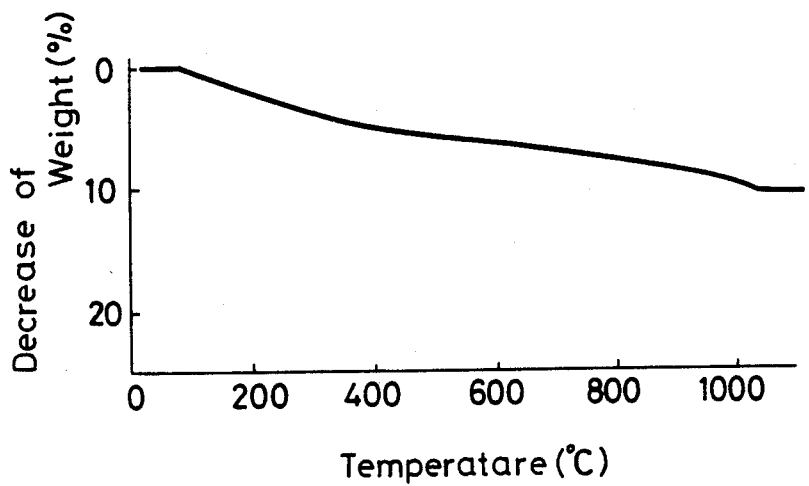

SrZrO$_3$ which was prepared under conditions of Sr/Zr=1, pH=14.9, 100° C. and 10 hours was subjected to the differential thermal analysis (DTA) and thermogravimetric analysis (TG). The results of these analyses are shown in FIGS. 8 and 9, respectively.

What is claimed is:

1. A method of manufacturing fine powder of strontium zirconate which comprises the steps of:
    reacting an oxide type hydrolyzate of a water soluble zirconium compound with a strontium compound in a strongly alkaline aqueous solution of a pH not less than 14.45 for a time sufficient to complete the reaction at a temperature not lower than 88° C., thereby forming SrZrO$_3$ as a precipitate;
    separating the precipitate from the solution; and drying the precipitate to obtain a fine powder of SrZrO$_3$.

2. The method according to claim 1, wherein the pH is not lower than 14.6.

3. The method according to claim 1, wherein the reaction between the hydrolyzate and the strontium compound is effected in an Sr-to-Zr molar ratio not smaller than 0.35:1.

4. The method according to claim 3, wherein the molar ratio is not smaller than 0.7:1.

5. The method according to claim 1, wherein said zirconium compound is a member selected from the group consisting of ZrCl$_4$, ZrOCl$_2$.8H$_2$O, Zr(NO$_3$)$_4$, ZrO(NO$_3$)$_2$.2H$_2$O, Zr(SO$_4$)$_2$, and ZrOSO$_4$.

6. The method according to claim 1, wherein said strontium compound is a member selected from the group consisting of SrO, Sr(OH)$_2$, Sr(OH)$_2$.8H$_2$O, SrCl$_2$, Sr(NO$_3$)$_2$, and Sr(CH$_3$COO)$_2$.

* * * * *